(12) United States Patent
Guthrie et al.

(10) Patent No.: US 6,606,627 B1
(45) Date of Patent: Aug. 12, 2003

(54) TECHNIQUES FOR MANAGING RESOURCES FOR MULTIPLE EXCLUSIVE GROUPS

(75) Inventors: Christine Pae Guthrie, Menlo Park, CA (US); Jesper Andersen, Fremont, CA (US); Douglas James McMahon, Redwood City, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/940,870

(22) Filed: Aug. 27, 2001

Related U.S. Application Data

(63) Continuation-in-part of application No. 09/872,896, filed on May 31, 2001.
(60) Provisional application No. 60/289,716, filed on May 8, 2001.

(51) Int. Cl.[7] .............................................. G06F 17/30
(52) U.S. Cl. .................................. 707/10; 707/5; 707/9
(58) Field of Search ................................. 709/202, 203; 707/1, 5, 9, 10, 100; 340/5.54; 235/382

(56) References Cited

U.S. PATENT DOCUMENTS

| | | | | |
|---|---|---|---|---|
| 5,265,221 A | * | 11/1993 | Miller | 235/382 |
| 5,276,901 A | * | 1/1994 | Howell et al. | 340/5.54 |
| 5,428,778 A | * | 6/1995 | Brookes | 707/5 |
| 5,751,949 A | * | 5/1998 | Thomson et al. | 713/201 |
| 5,765,154 A | | 6/1998 | Horikiri et al. | 707/10 |
| 5,787,428 A | * | 7/1998 | Hart | 707/9 |
| 5,940,818 A | * | 8/1999 | Malloy et al. | 707/100 |
| 6,134,549 A | * | 10/2000 | Regnier et al. | 345/753 |
| 6,275,824 B1 | * | 8/2001 | O'Flaherty et al. | 707/10 |
| 6,363,387 B1 | * | 3/2002 | Ponnekanti et al. | 707/1 |

\* cited by examiner

*Primary Examiner*—Diane D. Mizrahi
*Assistant Examiner*—Yicun Wu
(74) *Attorney, Agent, or Firm*—Brian D. Hickman; Hickman Palermo; Truong & Becker LLP

(57) ABSTRACT

Techniques for allowing an application designed to store data for one group of users to store data for a plurality of groups of users include modifying the application to cause the application to indicate a routine to a database server that stores data for the application in a database. The routine provides modifications to queries of the database, which limit access based on the groups to which belong users that cause the queries to be submitted. In response to receiving a query involving the database and caused by a particular user, the database server locates the routine, and, prior to executing the query, modifies the query. Modifying the query includes invoking the routine. The modification to the query thereby limits access of the particular user to data that is associated with the group of users to which the particular user belongs.

39 Claims, 10 Drawing Sheets

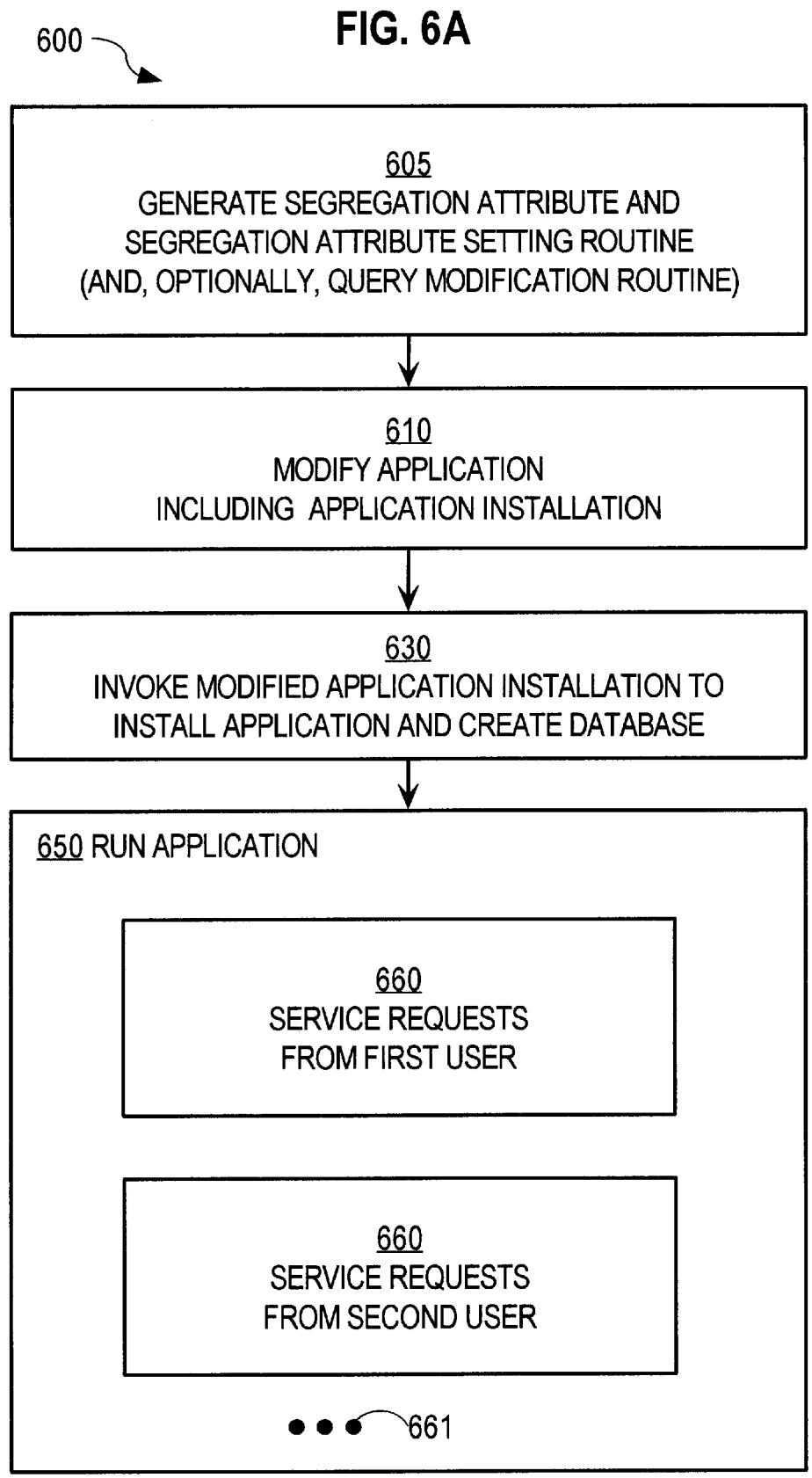

TECHNIQUES FOR MANAGING RESOURCES FOR MULTIPLE EXCLUSIVE GROUPS

RELATED APPLICATIONS

This application is a continuation-in-part of and claims priority to pending U.S. application Ser. No. 09/872,896, filed May 31, 2001, entitled "Virtually Partitioning User Data In A Database System", naming as inventors Christine Pae Guthrie, Jesper Andersen, Chon Hei Lei and Douglas James McMahon, the entire disclosure of which is hereby incorporated by reference.

This application claims priority to U.S. Provisional Application No. 60/289,716, filed May 8, 2001, entitled "Customer Relationship Management", naming as inventor Jesper Andersen, Christine Guthrie, Chon Hei Lei and Douglas James McMahon, the entire disclosure of which is hereby incorporated by reference.

FIELD OF THE INVENTION

The present invention relates to managing customer resources with database systems, and in particular, using access controls enforced by a database server for allowing an application designed to employ data for a single group of users to employ data for multiple exclusive groups of users.

BACKGROUND OF THE INVENTION

Use of commercial off-the-shelf applications ("packaged applications") has proliferated. Enterprises are buying packaged applications instead of developing in-house applications, avoiding the higher cost associated with developing their own in-house applications. The kinds of packaged applications that may be purchased include applications for financial processing, manufacturing work-flow, human resources, and customer relationship management, among many others. The packaged applications often store data in a database managed by a separate database server that is called by the application.

In addition to buying packaged applications, the enterprises are employing service companies to maintain the packaged applications and the computer systems upon which the applications run. One technique used by service companies to maintain and operate packaged applications is referred to as application hosting. Application hosting refers to a host (e.g. a service company) maintaining one or more applications for multiple enterprises (e.g., customers) on one or more computer systems, using the same computer infrastructure to run all the packaged applications. The term hosting environment refers to all the various components being maintained for an enterprise, including application components and computer infrastructure components (e.g. operating system, hardware). A hosting environment may be accessed via, for example, the Internet, which is public, or an extended intranet that is not public. Application hosting can reduce the cost of managing applications because it allows customers to share the resources of the service company needed to run a packaged application, resources which include computer components, application experts, and computer administrative support personnel, all of which are needed to operate an application.

The terms customer or enterprise are used herein to refer to a particular group for whom an application and its associated data are being hosted. The group may be a human individual or an organization, including, without limitation, a business.

A typical hosting environment typically follows the "silo" model. Under the silo model, limited components in the environment are shared by groups while most components are maintained separately for each group.

FIG. 1 is a block diagram used to depict silo model 101. Silo model 101 includes hosting environment component layers 110, 120, 130, 140, 150, and 160. Machine layer 110 represents the various hardware components used in a hosting environment, such as computers and disk drives. Operating system layer 120 represents the operating system used in a hosting environment, database server layer 130 corresponds to the database servers used in a hosting environment, schema layer 140 represents a collection of database objects in a database system and the metadata about the database objects in the collection, database object layer 150 refers to the database objects in each schema. Application layer 160 refers to hosted application software.

Machine layer 110 and operating system layer 120 are typically shared while the remaining layers are typically not shared by multiple groups. Thus, a separate instance of a database server and application server is created and maintained for each group serviced by the hosted application. These separate instances are referred to as a silo. For example, silos 171 and 172 are instances of unshared database server and application server components for two particular groups.

Whether a hosting environment component can be shared affects the "scalability" of the hosting environment. The term "scalability", as used herein, refers to the rate at which more resources are needed to host additional groups. A hosting environment scales better when less additional resources are needed to support new groups.

Sharing operating system and machine layers 110 and 120 promotes better scalability. An additional group does not require installation of another operating system. On the other hand, the unshared nature of database server layer 130 and application layer 160 impedes scalability. Adding an additional group requires installation of another instance of the database server and application. In general, adding another instance of a hosting environment component to support an additional group requires greater additional resources than would be required otherwise by using an already existing component to support the additional group. Adding an additional instance of another hosting environment component requires more labor to install and maintain than simply reconfiguring and maintaining an existing instance to support another group.

Improved scalability may be achieved by sharing more hosting environment component layers. For example, a single database server may be used for multiple groups. The application instances that access the database server access data in separate schemas within the database system. Each schema contains database objects for a particular enterprise. For example, data for one hosted payroll application instance may be stored in a table PAYROLL in one schema for one group, while data for another hosted payroll application instance may be stored in a table PAYROLL in another schema for another group.

To further improve scalability, application software and database objects may be shared. However, sharing application software and database objects introduces additional problems. Typically, application software is not developed with the features needed to use one instance of the application software to handle multiple groups. For example, application software is not configured to restrict user access to data according to the group of the user accessing the data.

Typically, one group desires to separate its data from the data of another group, and to confine access to its data to the users belonging to the one group. Groups that desire to keep their data exclusively for themselves and separate from other groups are herein called exclusive groups or segregation groups. For example, ABC Corp. wishes the payroll data it has in the payroll application to be segregated from the payroll data that XYZ Inc. has in the payroll application. However, an instance of the application software typically uses one schema or set of database objects to store data, and provides no mechanism to logically or physically separate the data of multiple groups within a single set of database objects. Consequently, conventional applications have no support for a mechanism to restrict user access to only the separate data of the group to which the user belongs.

Legacy application software may be re-engineered to restrict access to data according to the group of the user. However, such modifications can be very expensive. For example, every database command programmed for an application may have to be examined and possibly rewritten so that the database query requests access to only the data of a particular segregation group. The term database query refers to commands that request the retrieval, selection, insertion, and modification of records. Typically, database queries conform to a database language. For example, many database queries conform to a standard query language (SQL).

Rather than try to re-engineer existing software applications, a new application may be developed to handle multiple groups. However, developing software with this capability requires greater development effort and costs more. For example, queries that are developed to limit access to data of a particular enterprise are more complicated to program.

Based on the foregoing, it is clearly desirable to provide techniques that convert applications designed to operate as separate instances for each exclusive group to operate as a single instance that handles multiple exclusive groups. Such techniques allow a service company to achieve greater scalability for the application while minimizing the cost of a developing or redeveloping such applications.

SUMMARY OF THE INVENTION

Techniques are provided for allowing an application designed to store data for one group of users to store data for a plurality of groups of users. The techniques include modifying the application to cause the application to indicate a routine to a database server that stores data for the application in a database. The routine provides modifications to queries of the database, which modifications limit access of those queries based on the groups to which belong users that cause the queries to be submitted. In response to receiving a query involving the database and caused by a particular user, the database server locates the routine, and, prior to executing the query, modifies the query. Modifying the query includes invoking the routine. The modification to the query thereby limits access of the particular user to data that is associated with the group of users to which the particular user belongs.

According to another embodiment, techniques for allowing an application designed to store data for one group of users to store data for a plurality of groups of users includes modifying the application to cause the application to indicate data segregation criteria to a database server that stores data for the application. In response to receiving a query that inserts one or more data items into the database from the application, submitted by a particular user, the database server automatically adds to each data item one or more values that indicate how the particular user satisfies the segregation criteria.

Using these techniques, an application designed for a single group of users can be modified easily to keep separate the data of multiple exclusive groups. A modification developer determines a segregation attribute, a routine to set values for the segregation attribute based on the user, and a routine to modify queries based on the values of the segregation attribute. The modification developer then modifies the application installation process to indicate to the database server the segregation attribute, the routine to set its value, and the routine to modify queries.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6A is a flowchart that illustrates at a high level a method for allowing an application designed to employ data for one group of users to employ data for multiple exclusive groups of users according to an embodiment;

DETAILED DESCRIPTION OF THE PREFERRED EMBODIMENT

Techniques for allowing an application to employ data for multiple exclusive groups are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

THE VIRTUAL PRIVATE DATABASE (VPD)

Figure 1:
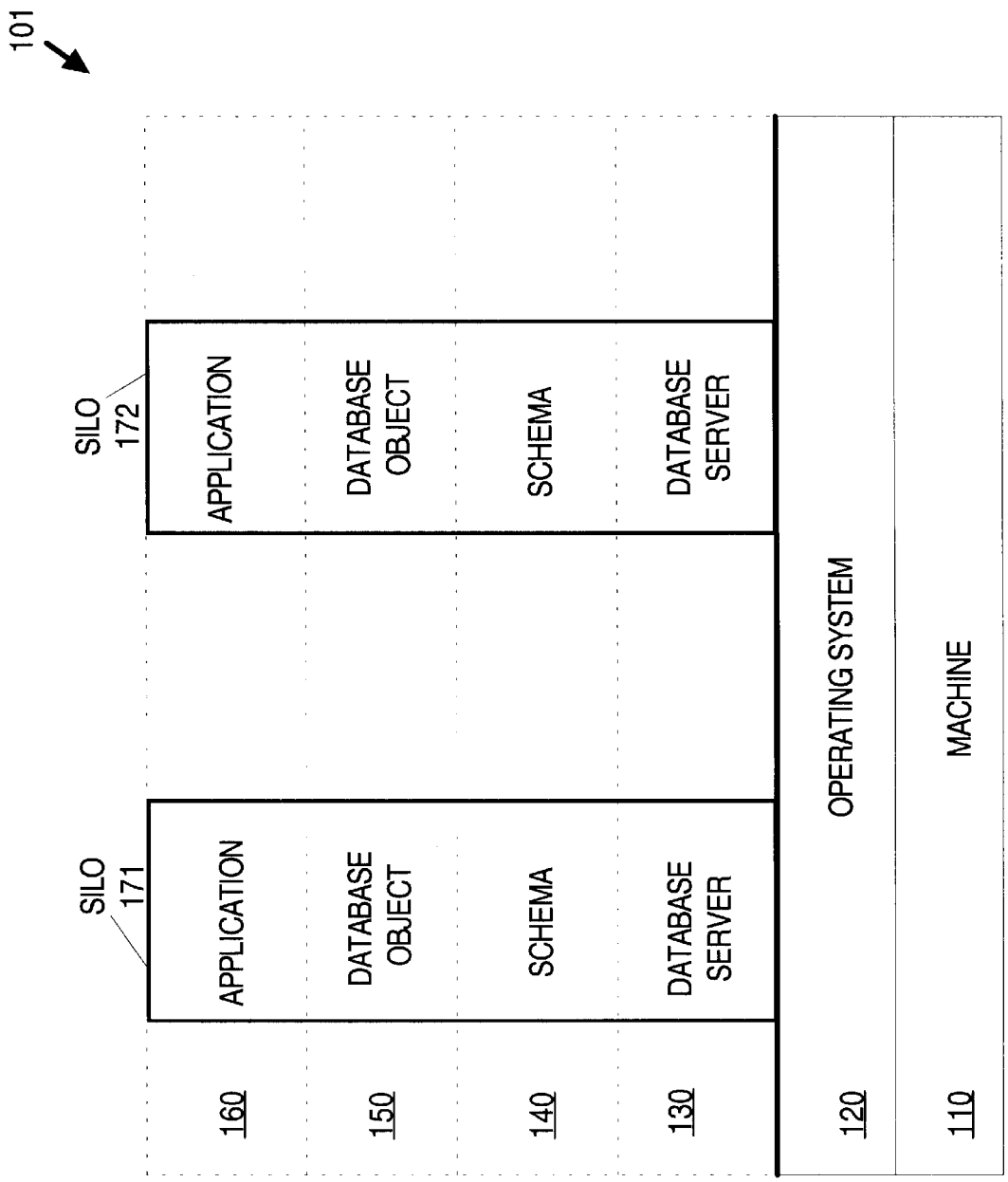
FIG. 1 is a block diagram that illustrates a silo model, hosting environment to provide an application for multiple exclusive groups.
Figure 2:
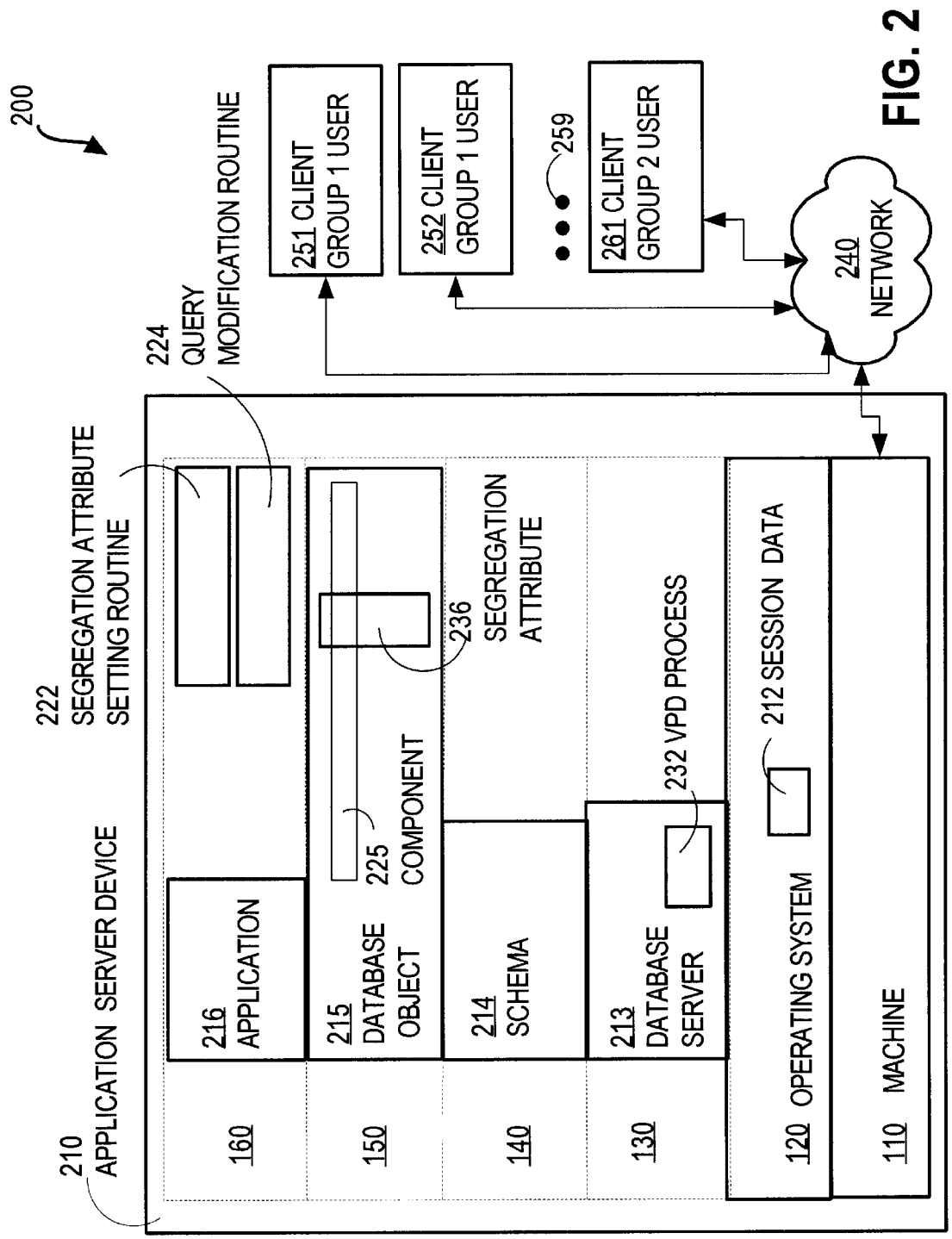
FIG.2 is a block diagram that illustrates a hosting environment employing a single instance of an application and a virtual private database to provide the application for multiple exclusive groups according to an embodiment.

The virtual private database (VPD) is, according to one embodiment, an option of a database server that enforces access controls defined by a database administrator on all users of a database schema, including applications that access the database schema. The VPD is described in the related application entitled "Virtually Partitioning User Data In A Database System" incorporated by reference above. According to an embodiment, the VPD provides a mechanism for a single instance of an application to keep data separate for different exclusive groups, called hereinafter segregation groups. Typically a segregation group represents a company, but the segregation group may represent any grouping of users, such as groupings based on user name, company ID and department, government agency, country and province, zip code, telephone exchange, domain name, military rank, or other characteristic of a user FIG. 2 is a block diagram that illustrates a hosting environment employing a single instance of an application and a virtual private database to provide the application for multiple segregation groups, according to an embodiment. Unlike the hosting environment of the silo method depicted in FIG. 1, the hosting environment of FIG. 2 contains a single instance of the application and database system, including the database server, the schema and the database objects, for all users of all segregation groups.

As shown in FIG. 2, an application server device 210 including application 216 is connected to network 240. Also connected to the network 240 are client devices running client processes for various users of the application. Some users belong to a segregation group 1 and some users belong to a segregation group 2. For example, group 1 may consist of employees of ABC Corp. For purposes of explanation, it is assumed that ABC Corp. has a company identification (company ID) of "C-A." Group 2 may consist of accountants for XYZ Inc. For purposes of explanation, it is assumed that XYZ Inc. has a company ID of "C-B." Client process 251 accessing application 216 is running for a first user of group 1 and client process 252 is running for a second user of group 1. Ellipses 259 indicate that other users of group 1 are connected to the network 240 for accessing application 216. Client process 261 accesses application 216 for a first user of group 2.

Figure 4:
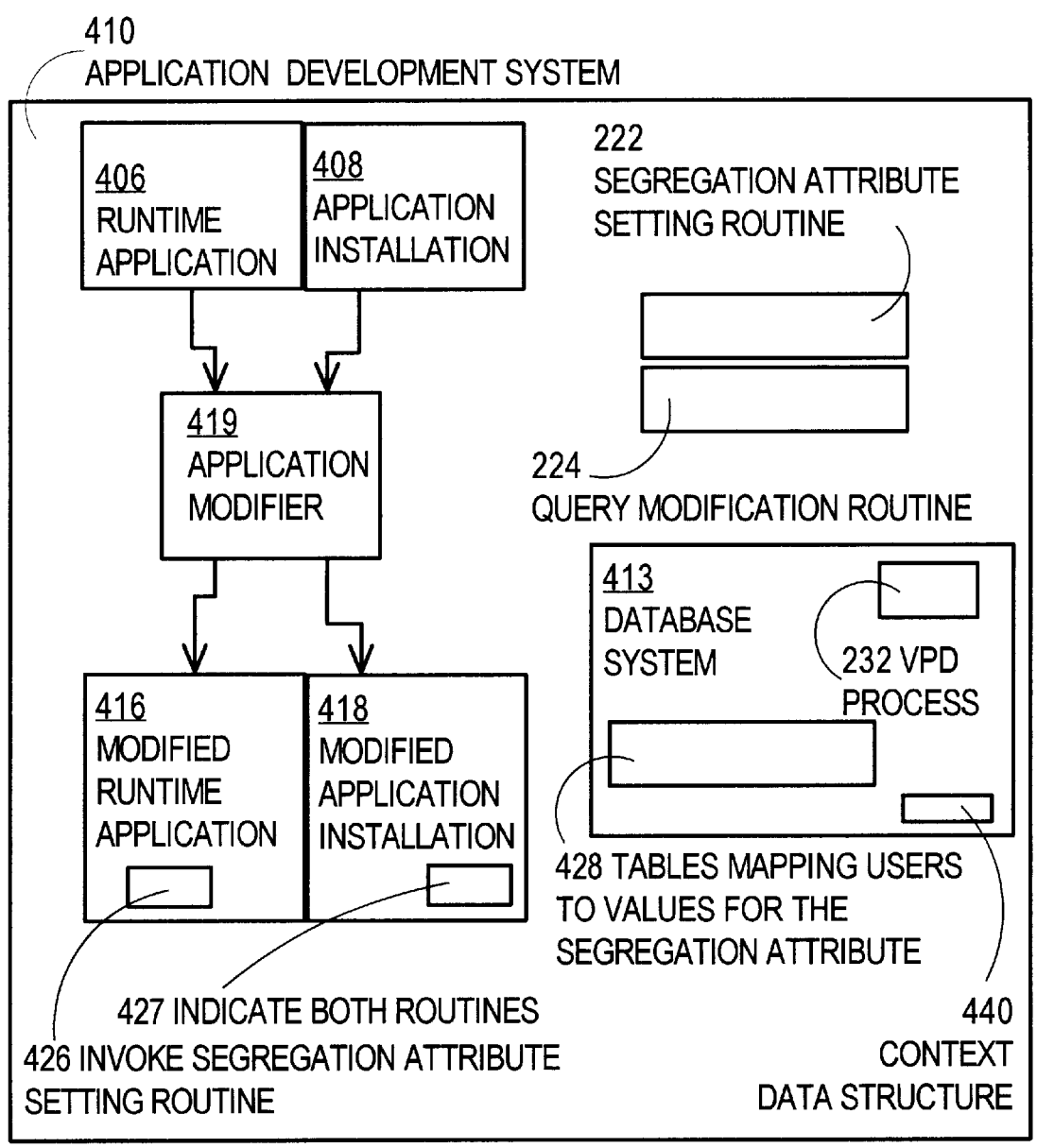
FIG. 4 is a block diagram that illustrates an application development system that modifies an application so that the application may be used in a hosting environment employing a single instance of the application and a single instance of the database system to provide the application for multiple exclusive groups according to an embodiment.

When a client process connects to application server device 210, a session between the application and that particular user is established by the machine 110 and operating system 120. The data relating to the communication session, including the user's identification information (user ID) is stored in the session data 212. In some embodiments, the session involves encrypted data and use of a user ID and a password, such as over a secure socket layer (SSL). In some embodiments, the session data includes secure socket layer information. In the illustrated embodiment, the database server accesses the information in session data 212 and stores session data including the user ID in a context data structure 440 (FIG. 4).

Database objects are logical data structures that are used by a database server to store and organize both data in the database and procedures that operate on the data in the database. For example, in a relational database, a table is a database object with data arranged in rows, each row having one or more columns representing different attributes or fields. Another database object in the relational database is a database view of certain rows and columns of one or more database tables. Another database object is an index of values that reside in a key column in a database table. The index has entries associated with values; and the index entry associated with a particular value typically points to the rows in the table having that particular value in the key column. Another database object is a database trigger. A trigger is a procedure that is executed upon an operation involving a database table. Data manipulation operations include adding a row, deleting a row, and modifying contents of a row, among others. Database definition operations include adding a table, adding a row to a table, and adding an index for a table, among others. Another database object is a package of procedures that may be invoked and executed by the database server. In general, a database object includes one or more data items, each data item having values for one or more attributes.

According to the embodiment illustrated in FIG. 2, the database server 213 of the database server layer 130 includes a virtual private database (VPD) process 232, described in more detail below with respect to FIG. 3. First, a segregation attribute is established for a particular application. Then, when the application 216 creates a database object 215, the VPD automatically adds a segregation attribute 236 to the database object. For example, assuming that "company ID" is the segregation attribute for a payroll application, when the payroll application creates a payroll table with columns for employee name and employee salary, the VPD automatically adds a column for company ID. When the application 216 stores a data item 225 in the database object 215 for a particular user, the VPD automatically inserts a value for segregation attribute 236 that is based on an identity of the particular user.

The VPD invokes a segregation attribute setting routine 222 to determine the value of the segregation attribute for the particular user. According to an embodiment that keeps data from segregation groups separate, the segregation attribute setting routine 222 is written to provide a unique identifier for each segregation group when a user identification is provided as input, as described in more detail below with reference to FIG. 5A. For example, a user of client process 251 communicating with the application has a user ID "U-X". When this user is associated with a database query, the VPD invokes the segregation attribute setting routine 222 to determine that, for a user with user ID "U-X," the segregation attribute "company ID" has a unique identifier value "C-A".

The VPD also invokes a query modification routine 224 to modify the query generated by the application for storing a data item. The query is modified to insert the value of the segregation attribute into the data item being stored. For example, the VPD invokes a query modification routine to modify an SQL "insert" query generated by the application for user having user ID U-X to also insert the value "C-A" associated with the user having user ID U-X in the company ID column.

When the application 216 retrieves data from the database for a particular user, the VPD automatically limits the data items retrieved to those having a value for the segregation attribute that matches the value for the segregation attribute associated with the particular user. For example, the VPD limits the rows returned in an SQL "select" query generated by the application for a user having user ID U-X to those rows where the value in the company ID column is C-A associated with the user having user ID U-X.

Figure 3:
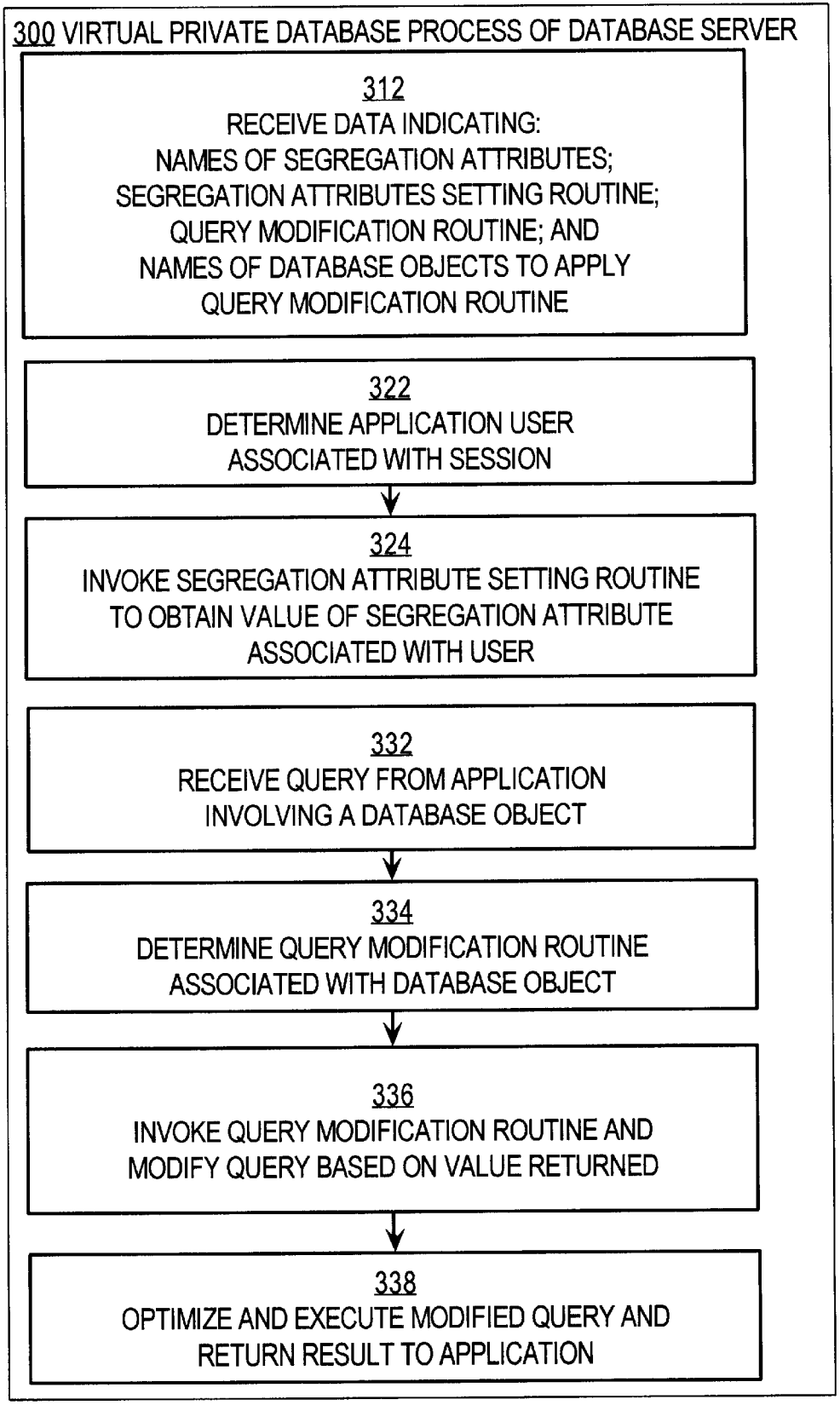
FIG. 3 is a flowchart that illustrates a virtual private database method of a database server according to an embodiment.

FIG. 3 is a flowchart that illustrates an embodiment 300 of virtual private database process 232 of a database server 213.

Although the steps are illustrated in FIG. 3, and in the following flowcharts, in a particular order, the steps may be reordered or occur at overlapping times in other embodiments.

In step 312, the VPD process receives data indicating (1) names of segregation attributes, (2) a reference for the segregation attributes setting routine, (3) a reference to one or more query modification routines, and (4) names of the database objects to which each query modification routine applies. The data can be passed in any manner known in the art, including as parameters of a call to a VPD routine, as a string of characters on a port, and as a text file written in a mark-up language. For example, a routine of the VPD process is invoked by a payroll application named "PayBest" with the name "company ID" as the segregation attribute and with the name of the file "Payroll_segregation" as a package including the routine set_company_id for setting company ID based on a user ID. In this example, a second routine of the VPD process is invoked by PayBest naming the routine mod_tables in the "PAYROLLpolicies" package as the query modification routine for queries for all tables in the schema belonging to the PayBest, including the PAYROLL table.

In step 322, after a user has established a session with the application server device 210, the VPD process of the database server determines the identity of a user of the application who is associated with the session. When a user of a client process logs onto the application server device, session data 212 is stored by the operating system including a user ID. For example, a user ID appears in the secure socket layer data stored by the operating system. In one embodiment, a trigger associated with the log-on process is fired when the user logs on, and the user ID is sent in a message to the database server and stored in a context data structure 440. In another embodiment, the user ID is included in a request for services passed to the application; and the application sends a message to the database server that indicates the user having the particular user ID is requesting services for the session. In yet another embodiment, the user ID is included with a first query from the database generated by the application during the session. For example, when a user having user ID U-X logs on, a trigger is fired sending a message to the VPD that user having user ID U-X is requesting services; and the VPD process saves in the context data structure 440 the user ID U-X in associated with the session.

In step 324, the VPD process invokes the segregation attribute setting routine to obtain a value of the segregation attribute associated with the user associated with the session. For example, the segregation attribute setting routine determines a value of C-A as the value of the segregation attribute company ID for user having user ID U-X and stores the value C-A in the context data structure 440 in association with the session and with user ID value U-X.

At some later time the application responds to a service request from the user by issuing a database query to the database server. In step 332, the VPD process intercepts the query. The query identifies a database object and a database operation, such as select, insert, delete or update.

In step 334, the VPD process determines the query modification routine associated with the database object. For example, the VPD process determines that the routine mod_tables in the PAYROLLpolicies package is associated with the PAYROLL table. In some embodiments the associated modification routine depends on the operation.

In step 336, the query modification routine is invoked and the query is modified based on the value returned. For example, for a query submitted for a user having user ID U-X, the mod_tables routine returns the predicate "company ID C-A" which specifies the segregation criteria to be satisfied. An insert query submitted for the user having user ID U-X is modified to include an SQL expression to insert the value C-A into the company ID column. A select query submitted for the user having user ID U-X is modified to include an SQL expression, such as "WHERE company ID=C-A."

In step 338, the modified query is optimized by the SQL optimizer and executed to perform the indicated operation on the database. For example, in response to an insert query submitted for user having user ID U-X, a row is inserted in the PAYROLL table with a new employee, a new salary, and the value C-A in the company ID column.

CONVERTING AN APPLICATION TO EMPLOY THE VPD

According to an embodiment, an application designed for employing data for only a single group of users is modified to employ data for multiple segregation groups. The modification does not involve changing the existing instructions to implement the application but only the addition of some instructions to provide to a VPD the information used by the VPD for the database objects created for the application.

FIG. 4 is a block diagram that illustrates an embodiment 410 of an application development system that modifies an original, single-group application to produce a modified, segregation-enabled application. The segregation-enabled application allows a hosting environment employing a single instance of the segregation-enabled application and underlying database server to provide the application services for multiple segregation groups. The segregation-enabled application uses the database server to segregate the application data for the multiple segregation groups.

As shown in FIG. 4, an application comprises a runtime application 406 and an application installation process 408. A developer responsible for creating the segregation-enabled application determines the segregation attribute setting routine 222 and the query modification routine 224 described above, and described further with reference to FIG. 5A and FIG. 5B, below.

To support the setting routine 222, the database system includes one or more tables 428 that map the user ID of a user to a value of the unique ID for the segregation group that serves as the value of the segregation attribute. In some embodiments, the segregation attribute has a single value; in some embodiments, the segregation attribute has a vector of several values. In some embodiments, multiple segregation attributes are simultaneously associated with the same database objects. Often, the segregation-enabled application developer creates one or more of the tables 428. In some embodiments, the tables 428 used by the setting routine 222 are original tables created by the original, single-group application.

For example, tables 428 include a User Table and a Company Table. The User Table has a row for each user who may log onto the application server device—each row having columns for the user ID, user's name, user's address, user's telephone number, and user's company's name. The Company Table has a row for each company that subscribes to the payroll services of the PayBest payroll application, each row having columns for the company ID, the company's name, the company's address, the company's federal tax identification number, a contact name, and a contact's telephone number. Segregation attribute setting routine 222 uses the company name associated with the user ID in the User Table to find the company ID in the Company table, so that the company ID may be used as the segregation attribute.

The developer also applies an application modifier process 419 to produce a "segregation enabled runtime application" 416 or a "segregation-enabled application installation process" 418 or both. The application modifier process 419 is described more below with reference to FIG. 6A. The segregation-enabled application installation process includes instructions 427 that indicate to the database server the segregation attribute setting routine 222 and the query modification routine 224. The modified runtime application includes instructions 426 that indicate to the database server the segregation attribute setting routine 222. In some embodiments, such as embodiments in which the value of the segregation attribute for a user is set by the VPD in response to a log-on trigger, the instructions 426 are omitted.

Figure 5A:
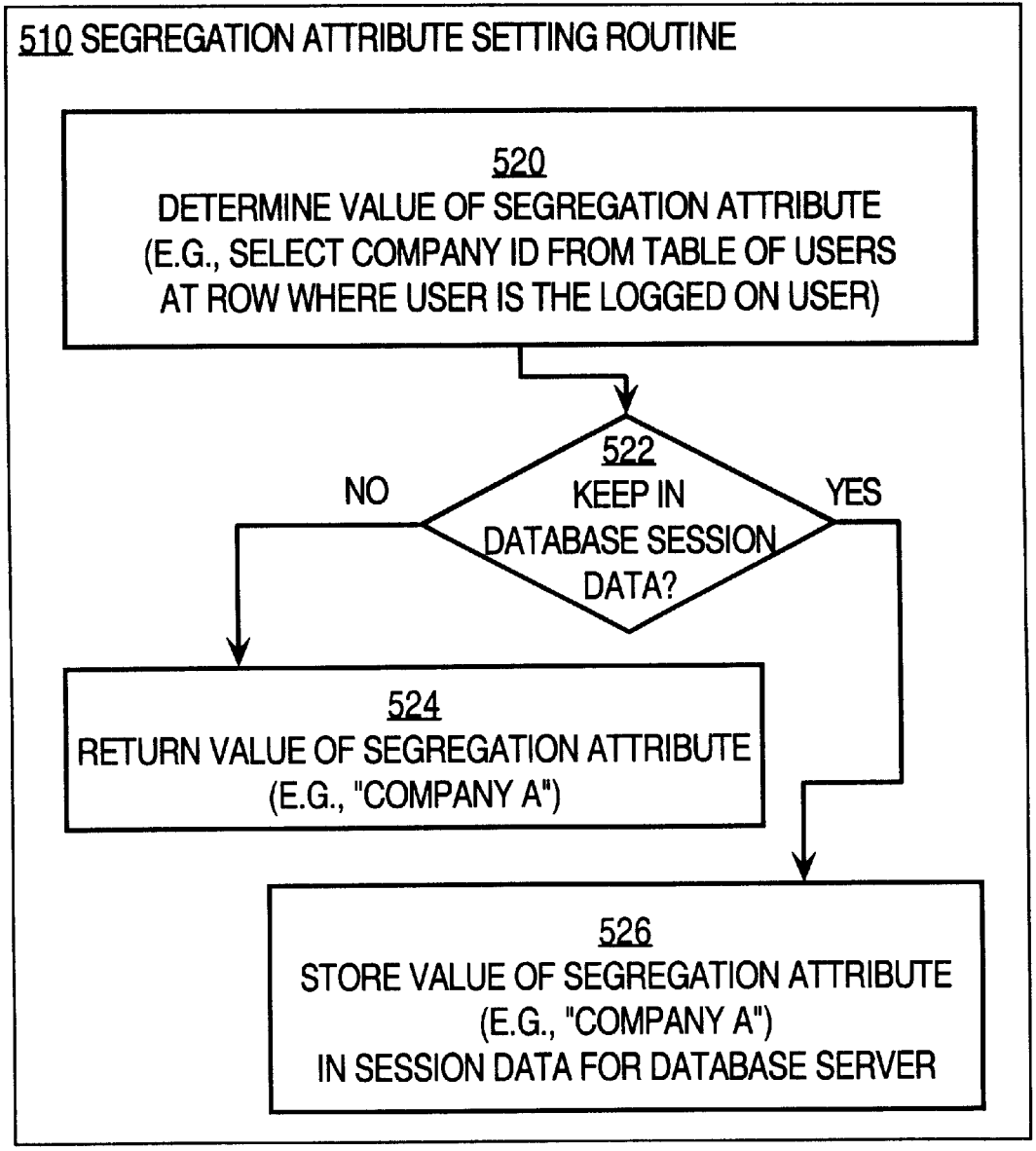
FIG. 5A is a flowchart for a method to set a segregation attribute for a virtual private database according to one embodiment.

FIG. 5A is a flowchart for a method 510 to determine a value for the segregation attribute, according to one embodiment. The method is produced to configure a virtual private database for the segregation-enabled application.

In step 520, a value of the segregation attribute for a particular user is determined based on the user ID of the particular user. For example, as described above when the user has a user ID of U-X, the company name, ABC Corp., is selected from the record in the User Table where the user ID is U-X. Then the company ID, C-A, is selected from the record in the Company Table where the company name is ABC Corp.

Step 522 represents a branch point based on where the value of the segregation application is stored. If the value is stored with the database session data in the context data structure 440, then control passes to step 526 to store the value there. For example, C-A is stored in the context data structure 440 along with U-X. If the value is not stored in the context data structure 440, control passes to step 524 to return the value of the segregation attribute to the database server routine that invoked the segregation attribute setting routine. For example, the data indicating C-A is returned to the calling routine. The branch can be implemented in any manner known in the art. For example, the two branches can be implemented as separate versions of the routine; and, only one version is used by one application, which always handles the value the same way. As another example, the branch can be based on the value of a parameter that is set by the administrator when the application is installed.

In some embodiments a built-in VPD process is used for determining the segregation attribute and its value setting routine. In this embodiment, the VPD process allows the developer to select one of a few, widely-used segregation attributes, such as company name and company ID; and, in response, the VPD process automatically provides the name for the segregation attribute and the routine to set its value and any tables for mapping a value of the user ID to a value of the segregation attribute.

Figure 5B:
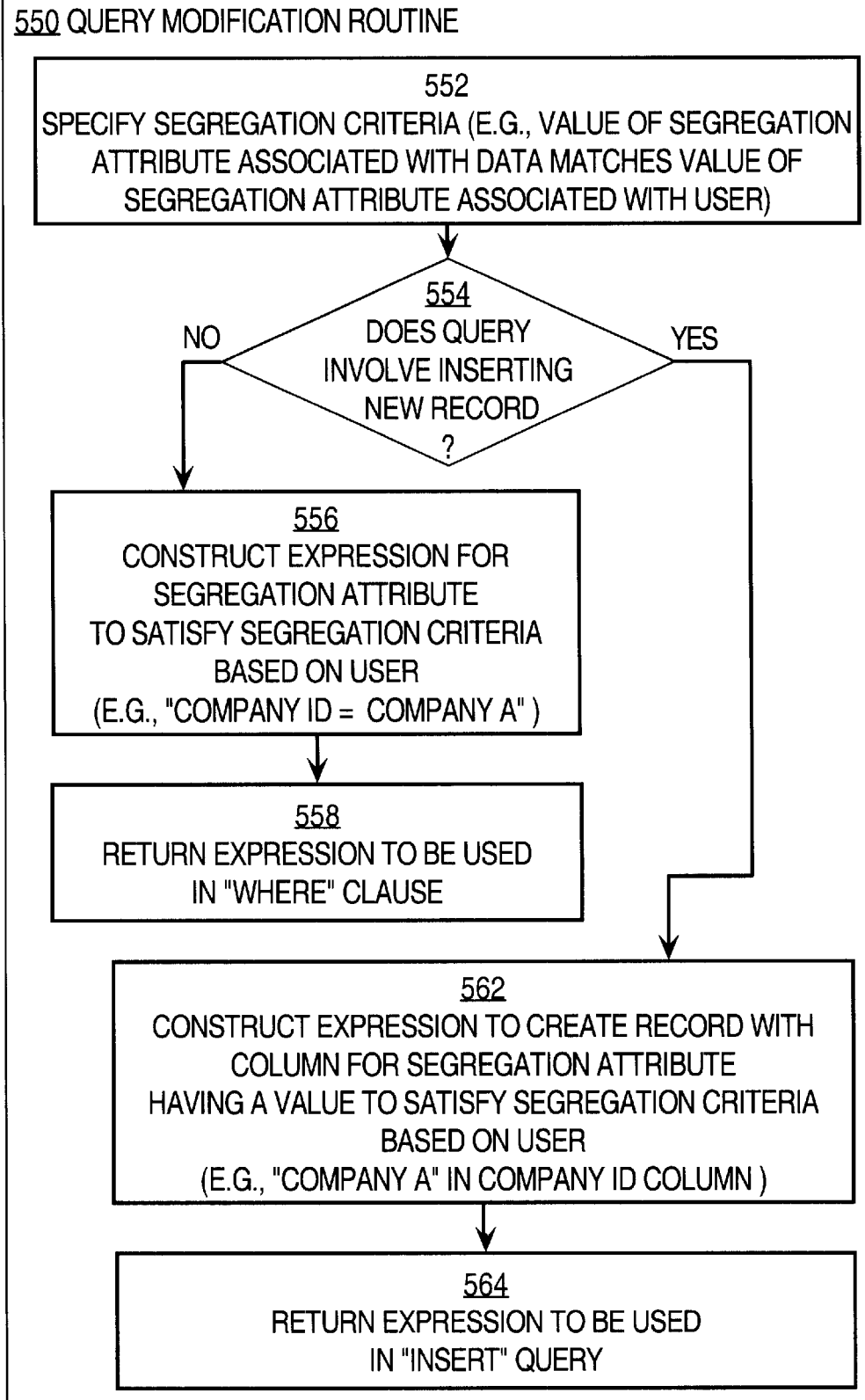
FIG. 5B is a flowchart for a method to provide modifications to a query for a virtual private database according to one embodiment.

FIG. 5B is a flowchart for a method 550 to determine modifications to a query, according to one embodiment. The method is produced to configure a virtual private database for the segregation-enabled application.

In step 552, segregation criteria used in the following steps are specified, based on the user ID and the segregation attribute setting routine. The segregation criteria are that the value of the segregation attribute associated with a data item matches the value of the segregation attribute associated with the user for the session. The user for the session is obtained from the particular user ID associated with the user in the session data. The value of the segregation attribute associated with the user is obtained by invoking the segregation attribute setting routine with a parameter indicating the user has the particular user ID obtained from the session data. For example, for a session with a user having user ID U-X, the segregation criteria are that the value of the segregation attribute in the company ID column of a row matches the value C-A, which is associated with the value U-X in the context data structure 440.

Step 554 represents a branch point depending on whether the query involves inserting a new data item (e.g., record) into a database object associated with the query modification routine. If an insert is involved, control passes to step 562. If not, control passes to step 556.

In step 556, an expression is constructed that is used as a predicate (a condition that must be satisfied before an action is taken) in the language used to query the database. For example, the expression "company ID=C-A" is constructed to be used in a WHERE clause of an SQL statement. In step 558, the expression is returned to the calling routine in the VPD process, which modifies the query based on the expression. For example, The expression "company ID=C-A" is returned to the VPD calling process, which adds to the original query "WHERE company ID=C-A" before executing the modified SQL statement. As a result, only data in rows generated by an employee of ABC Corp (having company ID "C-A") will be retrieved by the query for the user having user ID U-X.

If the query involves inserting a new record, as determined in step 554, the branch including 562 is taken. In step 562, an expression is constructed that is used to insert into the segregation attribute column, a value of the segregation attribute that satisfies the segregation criteria. For example, an expression to insert the value "C-A" into the company ID column is constructed, such as "INTO (company ID) VALUES ('C-A')." In step 564, the expression is returned to the VPD calling process, which adds company ID to the list of columns and "C-A" to the list of values on an insert query.

In the illustrated embodiment, the branch for inserting new rows in a table is included within the same query modification routine. In other embodiments, the branch for inserting new rows is a separate query routine for insert commands. In yet other embodiments, the VPD has built-in routines (1) to add the segregation attribute as a column in the schema for all the tables indicated as applying the query modification routine; (2) to insert the value of the segregation attribute from the context data structure 440 when a row is added to any of the tables with the segregation attribute column; and (3) to prevent a user from displaying or changing the contents of the segregation attribute column. The single-group application does not change or display the segregation attribute column because the single-group application did not create or use the segregation attribute column.

In some embodiments, the query modification routine, for queries that do not involve inserts, is a built-in VPD query modification routine. The built-in query modification routine (1) specifies the particular criteria that "the value of the segregation attribute associated with a row matches the value of the segregation attribute associated with the user for the session," and (2) obtains the segregation attribute name from the information received in step 312; (3) obtains the segregation attribute value for the session user from the context data structure 440; (4) constructs the expression that specifies the segregation attribute equals the segregation attribute value for the session user; and (5) returns the expression.

FIG. 6A is a flowchart that illustrates at a high level a method 600 for allowing an application designed to manage data for one group of users to manage data for multiple segregation groups of users according to an embodiment.

In step 605, the application modification developer generates a segregation attribute to distinguish the segregation groups, and a routine to set values of the segregation attribute based on the user. Any characteristic of a user may serve as a segregation attribute. For example, the modification developer generates a segregation attribute based on company name, company ID, company ID and department, government agency, country and province, zip code, telephone exchange, domain name, military rank, or other characteristic of a user. The developer then generates the routine to provide a value for the segregation attribute given a user ID in a communications session between the user and the application. This step includes determining any new tables to support the mapping between user ID values and segregation attribute values.

In some embodiments in which the segregation attribute is one of a few, widely-used segregation attributes, such as company name or company ID, the database server may provide built-in routines to create the tables to support the mapping and to set values for the segregation attribute. In such embodiments, generating the segregation parameter and the segregation attribute setting routine involves merely selecting one of the widely-used segregation attributes.

In some embodiments, step 605 includes generating the query modification routine to produce a predicate for data retrieval or to add columns for inserting new data items in one or more database objects. In some embodiments using the built-in query modification routines, the modification developer does not generate a new query modification routine, but merely determines to use the built-in routines.

In step 610, the application is modified. The application is modified by modifying the runtime application, or modifying the application installation process, or modifying both. In some embodiments, the application is modified to add instructions 426, 427 to cause a processor to perform steps 636, 638 and 664 described below with reference to FIG. 6B and FIG. 6C. In one embodiment, the steps are added without modifying the instructions that substantially specify the single-group application, such as the instructions that cause a processor to perform steps 640 and 666 described below with reference to FIG. 6B and FIG. 6C, respectively.

In step 630, the segregation-enabled application installation process is invoked to install the application and create the database, including the schema and the database objects. An embodiment of step 630 is described below with reference to FIG. 6B.

In step 650, the runtime application is executed, which performs a service for each user session according to process 660. In FIG. 6A, the runtime application is shown performing services in response to requests involving two user sessions. Ellipses 661 indicate that services may be performed in response to requests involving other user sessions. An embodiment of step 660 is described below with reference to FIG. 6C.

Figure 6B:
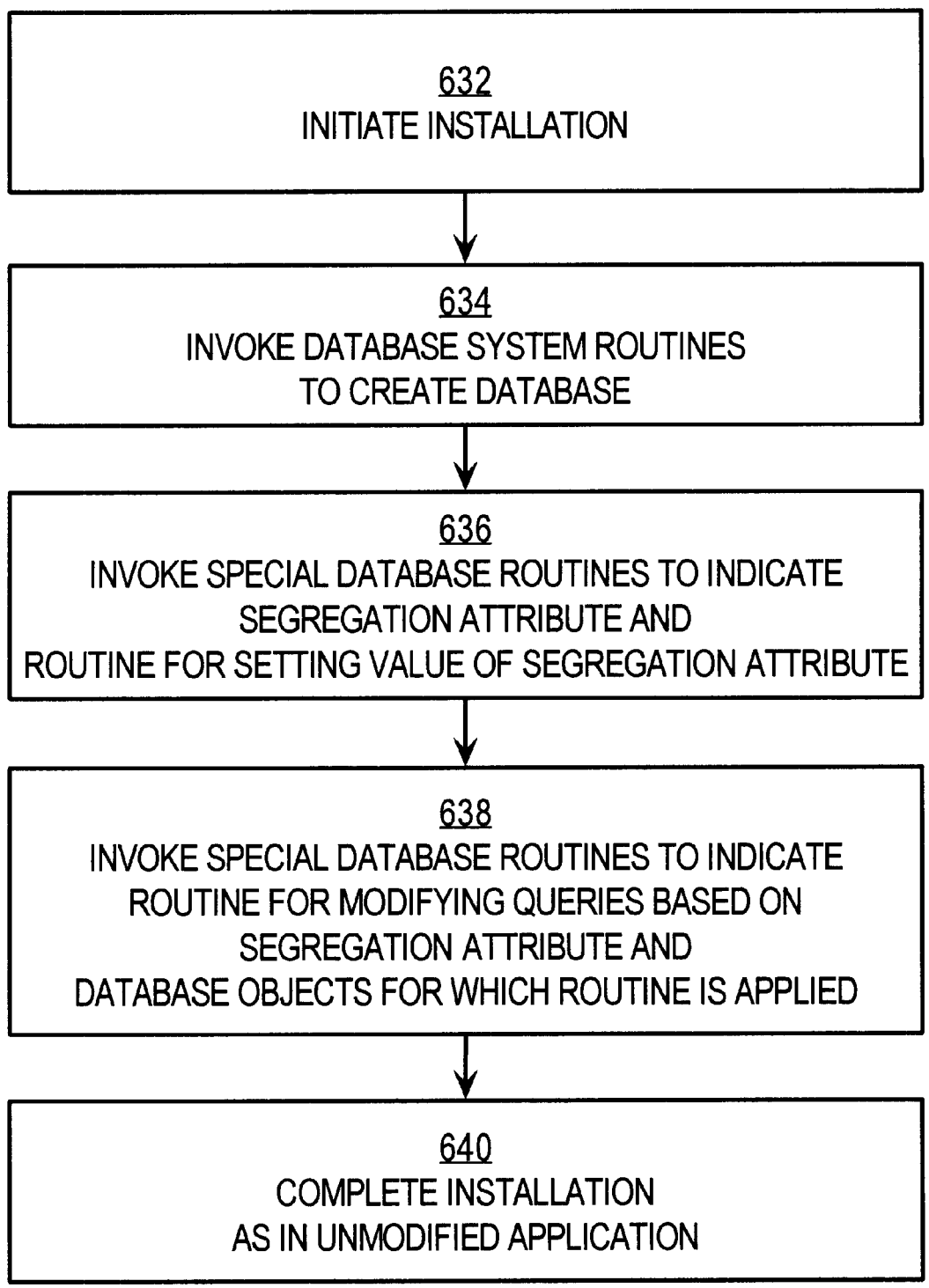
FIG. 6B is a flowchart that illustrates an embodiment of a step in FIG. 6A.

FIG. 6B is a flowchart that illustrates detailed steps for installing the application according to an embodiment 630a of step 630 in FIG. 6A.

In step 632, the installation is initiated and in step 634 database system routines are invoked to create the schema and database objects. In some embodiments, steps 632 and 634 are the same as performed in the single-group application. For example, a schema is created for the "PayBest" payroll application that includes a payroll table called Payroll, a users table called Users. In other embodiments, such as embodiments in which a table is added to support mapping between users and segregation attributes, additional database objects may be created in step 634. For example, a company table called Companies is created that includes a column for company name and another column for company ID.

In step 636, database routines of a virtual private database process are invoked to indicate the segregation attribute and the segregation attribute setting routine. For example, the installation process for the "PayBest" payroll application in the package, paybest, calls a virtual database process called "CREATE CONTEXT" to indicate the segregation attribute, company ID, and the sub-package, payroll_segregation, including the segregation attribute setting routine, set_company_id, as follows:

CREATE CONTEXT company_id USING
    paybest.payroll_segregation

In some embodiments, both company_id and payroll_segregation are replaced by built-in routines, in a VPD package, that segregate data in all database objects based on one of a set of widely-used segregation attributes such as company name or company ID. The application is still modified to include the CREATE CONTEXT command, but the segregation attribute name and package for setting its value are one of the built-in choices. For example:

CREATE CONTEXT company-name USING
    vpd.company_name_segregation

In step 638, database routines of a virtual private database process are invoked to indicate the query modification routine and the database objects to which the routine is applied. For example, the built-in query modification routine named user_match_data in the VPD package named vpd is indicated and associated with the Payroll table in the paybest schema with a call to a virtual database process called "ADD_POLICY" as follows:

DBMS_RLS.ADD_POLICY ('paybest', 'Payroll',
    'default', 'DBMS', 'vpd.user_match_data')

In another embodiment, the query modification routine may be applied to all the database objects in the paybest schema by replacing 'Payroll' in the above statement with ALL. For another example, the specially developed query modification routine named company_id_sec enforces a policy called CompanyID and is stored in the paybest package. This query modification routine is indicated and associated with the Payroll table in the paybest schema with the call to a VPD process as follows:

DBMS_RLS.ADD_POLICY ('paybest', 'Payroll',
    'CompanyID', 'paybest', 'paybest.company_id sec').

In step 640 the remaining steps from the single-group application installation process are performed according to a set of unmodified instructions. Most of the installation process is performed in this step, because the new instructions constitute a very small percentage of the total installation instructions.

Figure 6C:
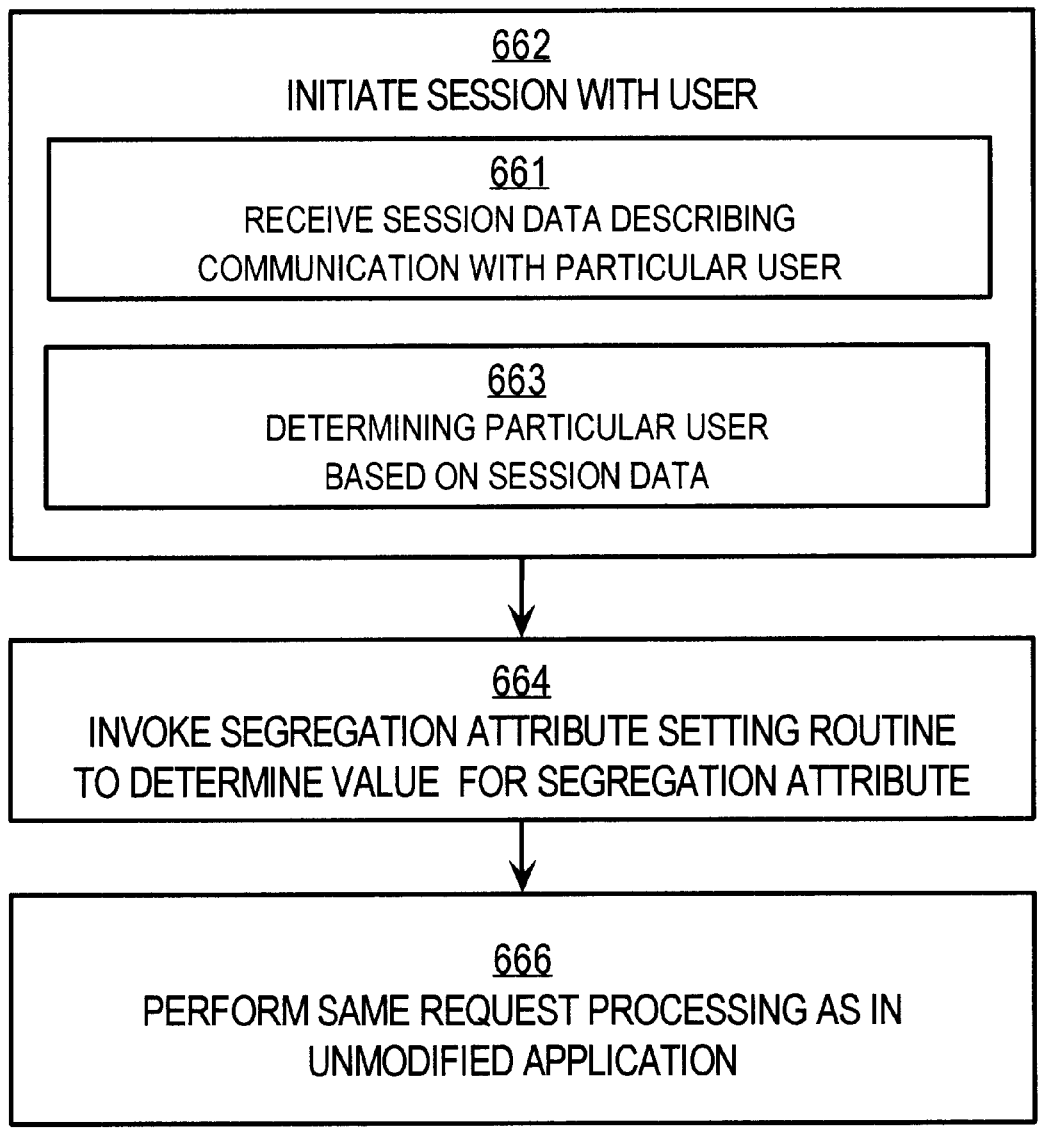
FIG. 6C is a flowchart that illustrates an embodiment of another step in FIG. 6A.

FIG. 6C is a flowchart that illustrates detailed steps performed by a runtime application according to an embodiment 660a of step 660 in FIG. 6A.

In step 662 a session is initiated with a user. For example, an initial request for payroll services is received by the runtime application indicating a session and a user. This step is performed according to the instructions in the single-group application.

In some embodiments, step 662 includes steps 661 and 662. In step 661, session data describing communication with a particular user is received by the application or the database server or both. For example, in one embodiment, the database server receives the session data in response to a log-on trigger. In another embodiment, the application issues an operating system command to obtain the session data from the operating system. In step 663, the particular user is determined based on a user ID in the session data. In one embodiment, the database server determines the user ID from the session data received from the log-on trigger. In another embodiment, the application determines the user ID from the session data received from the operating system.

In step 664, the runtime application invokes the segregation attribute setting routine, passing data indicating the user. In one embodiment, the segregation attribute setting routine returns the value of the segregation attribute associated with the user. In another embodiment, the segregation attribute setting routine stores the value in the context data structure 440. All subsequent queries for the session are automatically modified by the database server based on the value of the segregation attribute for the user in the current session.

In some embodiments, step 664 is omitted. For example, in some embodiments, a log-on trigger is fired to cause the VPD of the database server to invoke the segregation attribute setting routine and store the value in the context data structure 440.

In step 666, the remaining steps from the unmodified runtime application are performed according to a set of unmodified instructions. Most of the runtime process is performed in this step, because the new instructions constitute a very small percentage of the total runtime instructions. All queries generated in step 666 for the indicated tables are modified by the database server using the query modification routine and the value of the segregation attribute of the session user.

Using techniques described above, an application designed for a single group of users, can be modified readily to keep separate the data of multiple segregation groups, by having a modification developer determine a segregation attribute and routine to set values for the segregation attribute, and modify the application installation process to indicate the segregation attribute, the routine to set its value, and a routine to modify queries based on the value of the segregation attribute.

HARDWARE OVERVIEW

Figure 7:
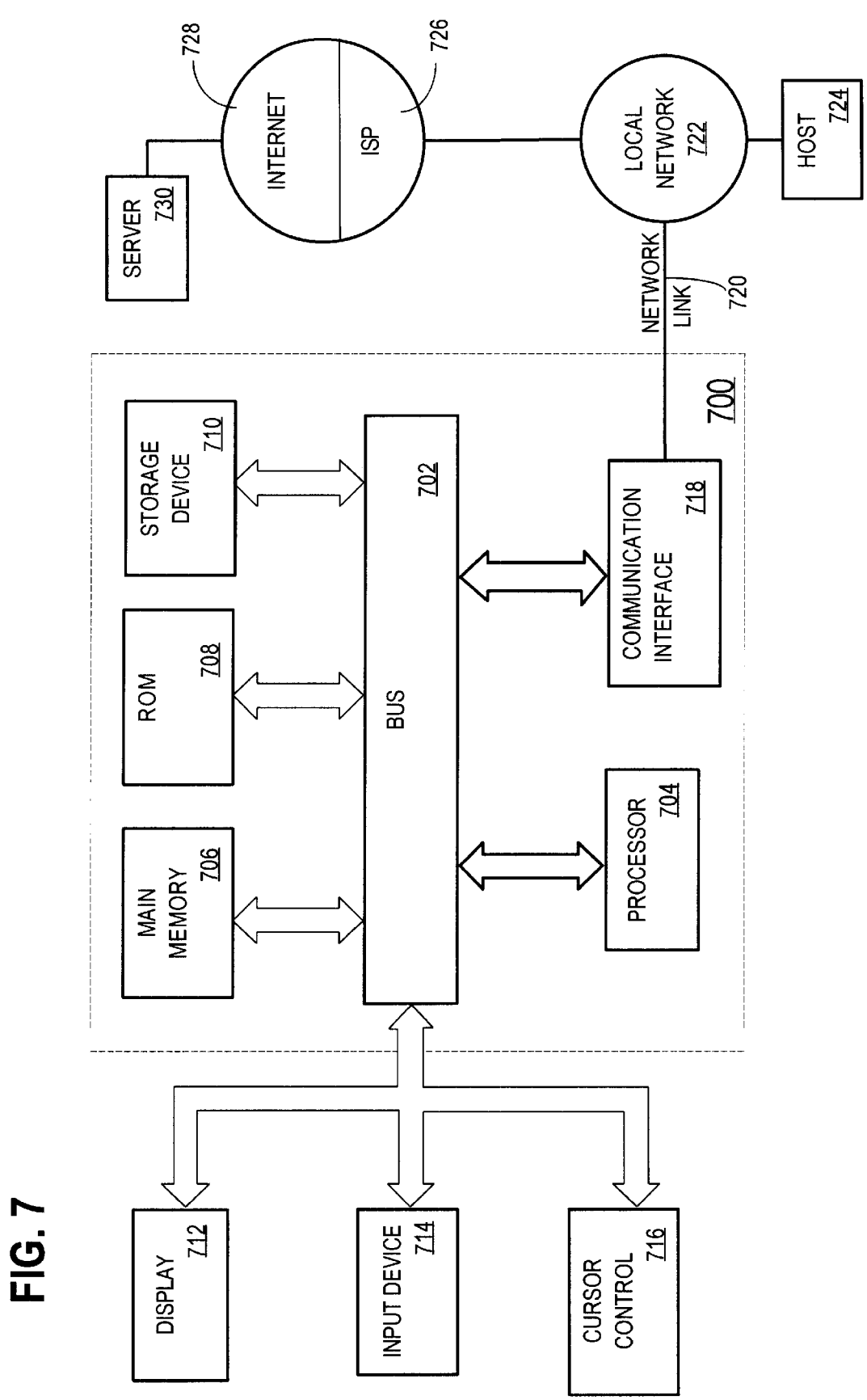
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program-code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allowing an application designed to store data for one group of users to store data for a plurality of groups of users, the method comprising the steps of:
    modifying the application to cause the application to indicate a routine to a database server that stores data for the application in a database;
    wherein:
        the application is distinct from the database server;
        the routine provides modifications to queries of the database, the modifications limiting access based on the groups to which belong users that cause the queries to be submitted; and
        in response to receiving a query issued against a database object of the database caused by a particular user, the database server performs the steps of locating the routine, and
        prior to executing the query, modifying the query by invoking the routine to create a modified query issued against the same database object, thereby limiting access of the particular user to data that is associated with the group of users to which the particular user belongs.

2. The method of claim 1, wherein:
    each user constitutes a distinct group; and
    the routine provides modifications to queries based on a unique identity of the user that causes the queries to be submitted.

3. The method of claim 1, wherein:
    before said step of modifying the application, the application is substantially specified by a first set of instructions; and
    said step of modifying the application does not include modifying the first set of instructions.

4. The method of claim 1, said step of modifying the application comprising adding to the application instructions that call a database server routine with a parameter of the database server routine having a value of a reference to the routine.

5. The method of claim 1, wherein:
    the particular user operates a client process that communicates with the application over a network;
    the database server receives session data describing communication with the client process over the network; and
    the routine further performs the steps of
        determining the particular user based on the session data, and
        determining the group to which the particular user belongs based on the particular user.

6. The method of claim 5, wherein the session data is based on data stored by an operating system in a secure socket layer.

7. The method of claim 1, said step of indicating the routine further comprising the step of invoking a first procedure of the database server, said step of invoking including passing as a parameter of the first procedure a reference to the routine.

8. The method of claim 7, said step of invoking the first procedure further comprising passing as a parameter of the first procedure data indicating a database object associated with the routine.

9. The method of claim 7, said step of invoking the first procedure further comprising passing as a parameter of the first procedure data indicating a query type associated with the routine.

10. The method of claim 1, further comprising:
    providing instructions for the routine in a file, which instructions cause a predicate to be returned to a calling routine, the predicate for adding to the queries; and
    said step of modifying the application comprises indicating a reference for the file to indicate the routine to the database server.

11. The method of claim 1, said step of modifying the application further comprises indicating a database server routine that limits access based on an enterprise to which the user belongs.

12. The method of claim 1, wherein:
    the routine limits access based on an unique group identification for each group of the plurality of groups; and
    the database includes database objects that associate all users of each group with the unique group identification of the group.

13. A method for allowing an application designed to store data for one group of users to store data for a plurality of groups of users, the method comprising the steps of:
    modifying the application to cause the application to indicate data segregation criteria to a database server that stores data for the application; and in response to receiving a query that inserts one or more data items into a database object of the database from the application, submitted by a particular user, the database server performs the step of automatically adding to each data item inserted into the same database object one or more values that indicate how the particular user satisfies the segregation criteria, wherein the application is distinct from the database server.

14. The method of claim 13, wherein, in response to receiving from the application a query submitted for the particular user, which query does not insert a data item into the database but requests access to certain data items in the database, the database server performs the step of determining that the particular user satisfies the segregation criteria for each data item accessed.

15. The method of claim 13, wherein:

before said step of modifying the application, the application is substantially specified by a first set of instruction; and said step of modifying the application does not include modifying the first set of instructions.

16. The method of claim 13, said step of modifying the application comprising adding a set of one or more additional instructions to indicate the data segregation criteria to the database server.

17. The method of claim 13, wherein:

the particular user operates a client process that communicates with the application over a network; and the database server determines the particular user based on session data describing communication with the client process over the network.

18. The method of claim 17, wherein the session data is based on data stored by an operating system in a secure socket layer.

19. The method of claim 13, said step of modifying the application to indicate the data segregation criteria comprising:

indicating a segregation attribute; and indicating a routine for setting a value for the segregation attribute for the particular user.

20. The method of claim 13, wherein:

the application uses a plurality of tables to store data for the plurality of groups of users; and the method further comprises causing the database server to add a column to each table of the plurality of tables, the column for storing one or more values that indicate how a user satisfies the segregation criteria.

21. A computer-readable medium carrying one or more sequences of instructions for allowing an application designed to store data for one group of users to store data for a plurality of groups of users, wherein execution of the one or more sequences of instructions by one or more processors causes the one or more processors to perform the steps of:

modifying the application to cause the application to indicate a routine to a database server that stores data for the application in a database;

wherein:

the application is distinct from the database server;

the routine provides modifications to queries of the database, the modifications limiting access based on the groups to which belong users that cause the queries to be submitted; and in response to receiving a query issued against a database object of the database caused by a particular user, the database server performs the steps of locating the routine, and prior to executing the query, modifying the query by invoking the routine to create a modified query issued against the same database object, thereby limiting access of the particular user to data that is associated with the group of users to which the particular user belongs.

22. The computer-readable medium of claim 21, wherein:

each user constitutes a distinct group; and the routine provides modifications to queries based on a unique identity of the user that causes the queries to be submitted.

23. The computer-readable medium of claim 21, wherein:

before said step of modifying the application, the application is substantially specified by a first set of instruction; and said step of modifying the application does not include modifying the first set of instructions.

24. The computer-readable medium of claim 21, said step of modifying the application comprising adding to the application instructions that call a database server routine with a parameter of the database server routine having a value of a reference to the routine.

25. The computer-readable medium of claim 21, wherein:

the particular user operates a client process that communicates with the application over a network;

the database server receives session data describing communication with the client process over the network; and the routine further performs the steps of determining the particular user based on the session data, and determining the group to which the particular user belongs based on the particular user.

26. The computer-readable medium of claim 25, wherein the session data is based on data stored by an operating system in a secure socket layer.

27. The computer-readable medium of claim 21, said step of indicating the routine further comprising the step of invoking a first procedure of the database server, said step of invoking including passing as a parameter of the first procedure a reference to the routine.

28. The computer-readable medium of claim 27, said step of invoking the first procedure further comprising passing as a parameter of the first procedure data indicating a database object associated with the routine.

29. The computer-readable medium of claim 27, said step of invoking the first procedure further comprising passing as a parameter of the first procedure data indicating a query type associated with the routine.

30. The computer-readable medium of claim 21, said step of modifying the application further comprises indicating a database server routine that limits access based on an enterprise to which the user belongs.

31. The computer-readable medium of claim 21, wherein:

the routine limits access based on an unique group identification for each group of the plurality of groups; and the database includes database objects that associate all users of each group with the unique group identification of the group.

32. A computer-readable medium for allowing an application designed to store data for one group of users to store data for a plurality of groups of users, wherein execution of the one or more sequences of instructions by one or more processors causes the one or more processors to perform the steps of:

modifying the application to cause the application to indicate data segregation criteria to a database server that stores data for the application; and in response to receiving a query that inserts one or more data items into a database object of the database from the application, submitted by a particular user, the database server performs the step of automatically adding to each data item inserted into the same database object one or more values that indicate how the particular user satisfies the segregation criteria, wherein the application is distinct from the database server.

33. The computer-readable medium of claim 32, wherein, in response to receiving from the application a query submitted for the particular user, which query does not insert a data item into the database but requests access to certain data items in the database, the database server performs the step of determining that the particular user satisfies the segregation criteria for each data item accessed.

34. The computer-readable medium of claim 32, wherein:

before said step of modifying the application, the application is substantially specified by a first set of instructions; and said step of modifying the application does not include modifying the first set of instructions.

35. The computer-readable medium of claim 32, said step of modifying the application comprising adding a set of one or more additional instructions to indicate the data segregation criteria to the database server.

36. The computer-readable medium of claim 32, wherein:

the particular user operates a client process that communicates with the application over a network; and the database server determines the particular user based on session data describing communication with the client process over the network.

37. The computer-readable medium of claim 36, wherein the session data is based on data stored by an operating system in a secure socket layer.

38. The computer-readable medium of claim 32, said step of modifying the application to indicate the data segregation criteria comprising:

indicating a segregation attribute; and indicating a routine for setting a value for the segregation attribute for the particular user.

39. The computer-readable medium of claim 32, wherein:

the application uses a plurality of tables to store data for the plurality of groups of users; and execution of the one or more sequences of instructions by the one or more processors further causes the one or more processors to perform the step of adding a column to each table of the plurality of tables, the column for storing one or more values that indicate how a user satisfies the segregation criteria.

\* \* \* \* \*